April 12, 1966     W. D. MILLER ETAL     3,245,583
GAS CHARGING AND LIQUID DISPENSING APPARATUS AND METHOD
Filed Feb. 11, 1964     3 Sheets-Sheet 1
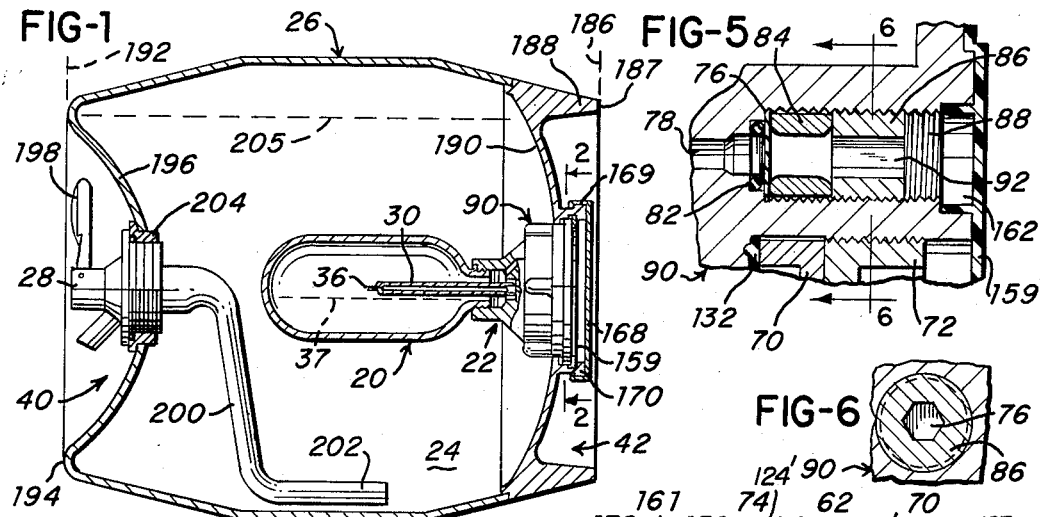
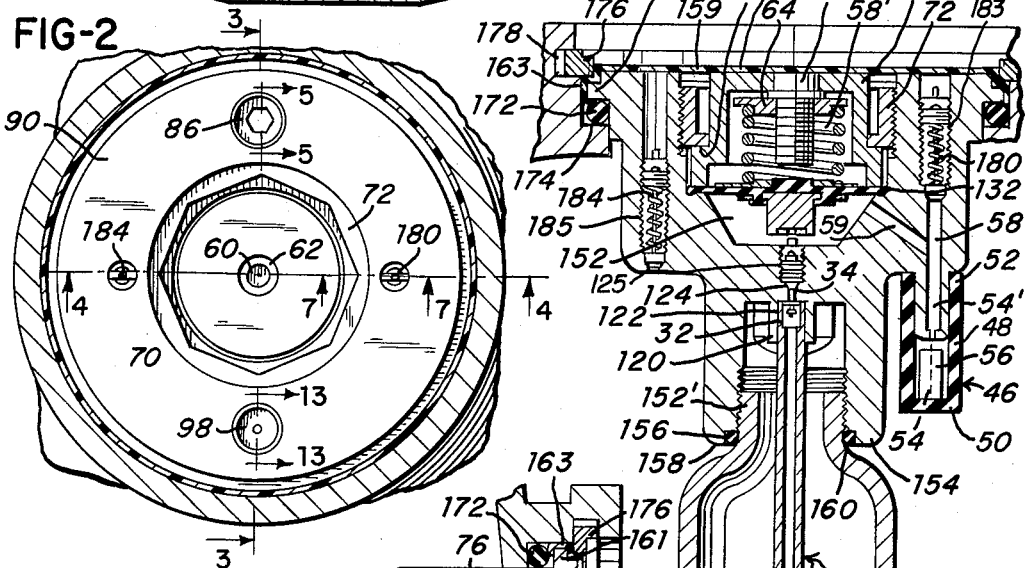
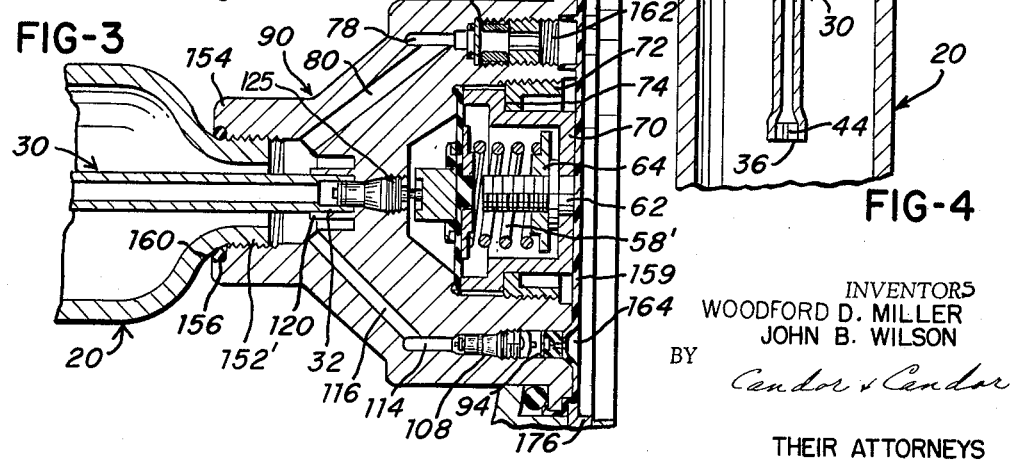
INVENTORS
WOODFORD D. MILLER
JOHN B. WILSON
BY
*Candor & Candor*
THEIR ATTORNEYS

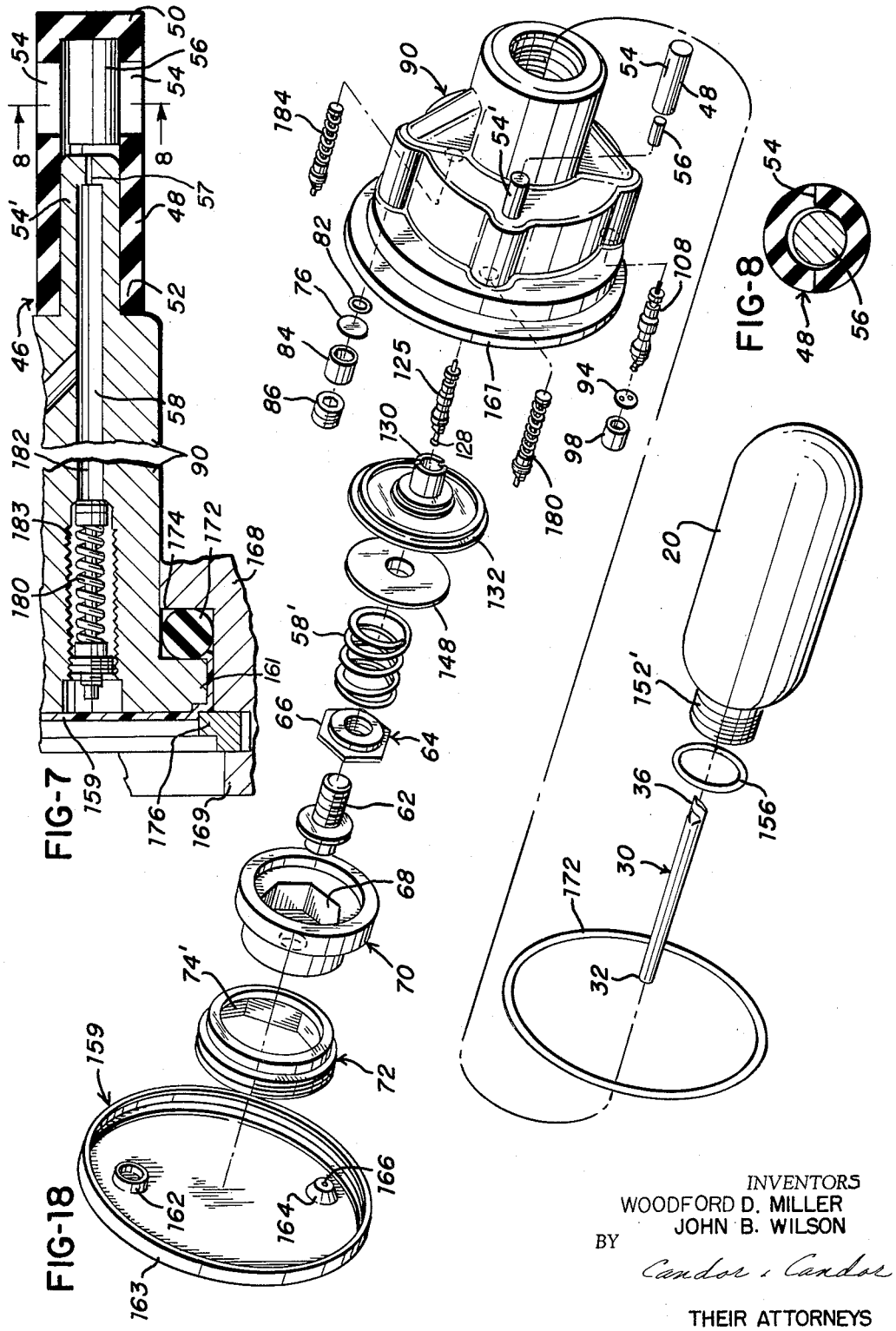

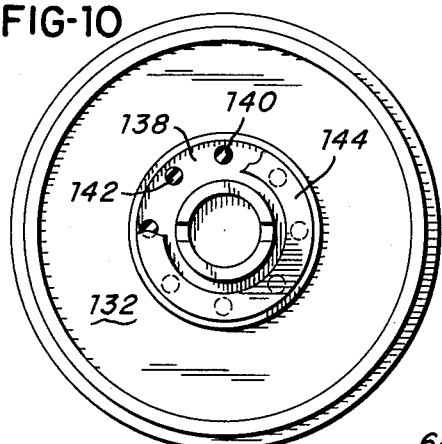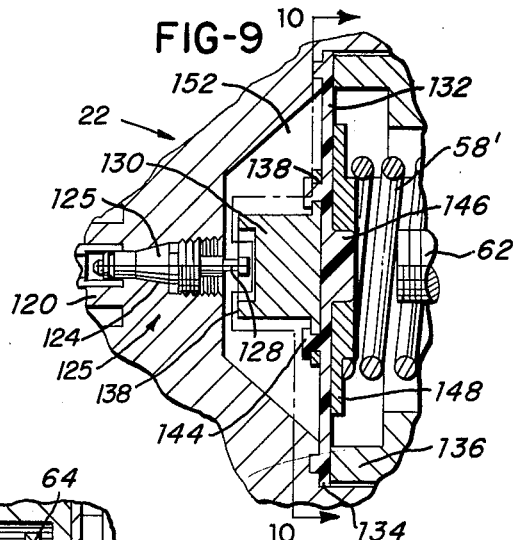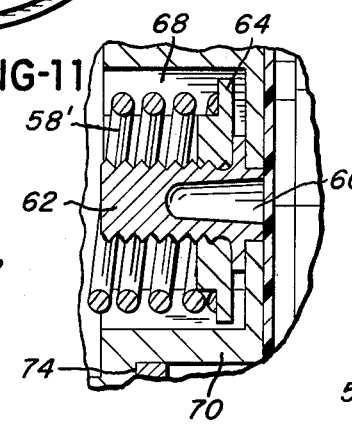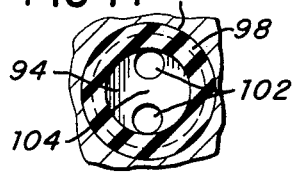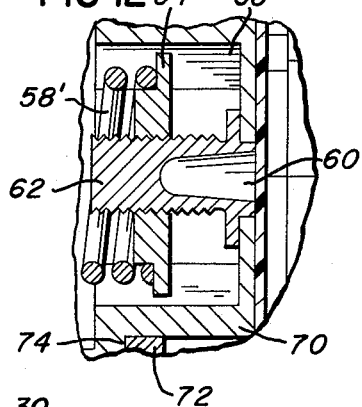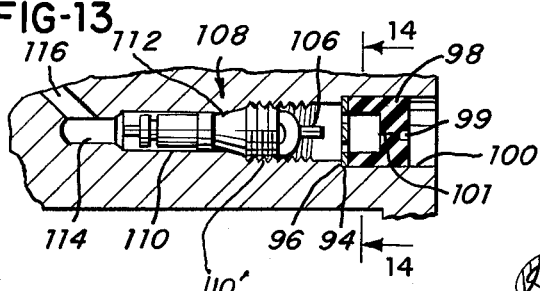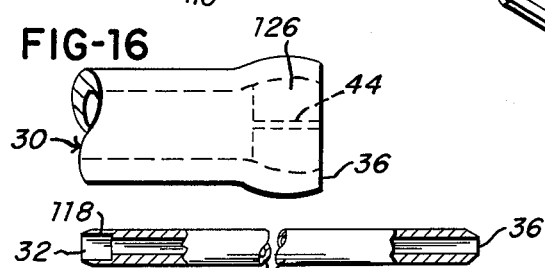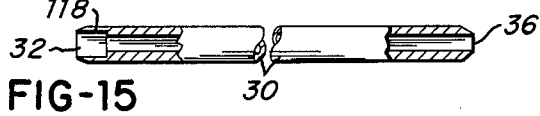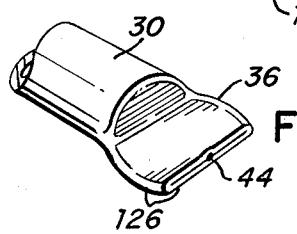

United States Patent Office 3,245,583
Patented Apr. 12, 1966

3,245,583
GAS CHARGING AND LIQUID DISPENSING
APPARATUS AND METHOD
Woodford D. Miller, Knoxville, Tenn., and John B. Wilson, Richmond, Va.; said Wilson, assignor, by mesne assignments, to Reynolds Metals Company, Richmond, Va., a corporation of Delaware
Filed Feb. 11, 1964, Ser. No. 344,148
18 Claims. (Cl. 222—52)

This invention relates to a gas charging and liquid dispensing apparatus and method.

This invention is particularly useful in connection with a dispensing beverage container to be kept in a domestic refrigerator. For example, such container may be capable of storing a substantial amount of beverage, such as in the order of 500 cubic inches of beer and the like, together with a charging gas container within the beverage container, such as a $CO_2$ container or bottle, capable of holding a sufficient quantity of charging gas, such as $CO_2$ in liquid form, to maintain the beverage in proper charged condition, as the beverage is gradually dispensed from the beverage container for drinking purposes, or the like.

The liquid and gas containers may be serviced at a brewery of other gas charged liquid supply establishment where the gas container may be temporarily removed from the liquid or beverage container. The containers may then be properly cleaned and sterilized, after which the beverage and charging gas may be introduced into their respective containers with the containers being assembled together in desired sequences.

This invention provides improvements which may be used in connection with these containers or elsewhere and which improvements are apparent from this description, the appended claimed subject matter, and from the accompanying drawings, in which:

FIGURE 1 is a diagrammatic cross section of an assembled charged liquid container and charging gas container after they have been serviced at a brewery or other gas charged liquid supply establishment.

FIGURE 2 is an enlarged cross section along line 2—2 of FIGURE 1.

FIGURE 3 is a cross section along line 3—3 of FIGURE 2.

FIGURE 4 is a cross section along line 4—4 of FIGURE 2.

FIGURE 5 is an enlarged detail cross section along line 5—5 of FIGURE 2.

FIGURE 6 is a cross section along line 6—6 of FIGURE 5.

FIGURE 7 is an enlarged detail cross section along line 7—7 of FIGURE 2.

FIGURE 8 is a cross section along line 8—8 of FIGURE 7.

FIGURE 9 is an enlarged detail cross section of a portion shown in FIGURE 4.

FIGURE 10 is a cross section along line 10—10 of FIGURE 9.

FIGURE 11 is an enlarged detail cross section of another portion shown in FIGURE 4, the screw being shown in cross section.

FIGURE 12 is a view similar to FIGURE 11, but showing the parts in adjusted position for greater spring compression.

FIGURE 13 is an enlarged detail cross section along line 13—13 of FIGURE 2.

FIGURE 14 is an enlarged cross section along line 14—14 of FIGURE 13.

FIGURE 15 is a cross section of the protecting tube before it is assembled on the supporting member and before one end is formed into a restrictor.

FIGURE 16 is an enlarged plan view showing an end of the tube of FIGURE 15 formed into a restrictor.

FIGURE 17 is a perspective view of the tube end shown in FIGURE 16.

FIGURE 18 is an exploded view of the gas container, the support for the gas container, and other supported parts which are shown in FIGURES 3 and 4.

One of the features of this invention includes means for preventing damage to the valve construction 22 and the formation of frost, such as $CO_2$ frost, when the relatively high pressure charging gas from the charging gas container 20 is expanded as it is reduced in pressure while it passes from the high pressure gas container 20 to the relatively low pressure space 24 within the charged liquid container 26 and which is outside and surrounds the gas container 20.

Since the refrigerated beverage, if it is beer, is generally refrigerated in a domestic refrigerator while it is in the beverage container 26, such beer may have a charged gas pressure of 13.5 p.s.i.g. (pounds per square inch gage). Since the charging gas within the charging gas container 20, if it is $CO_2$, may have an initial pressure in the neighborhood of from between 500 and 600 p.s.i.g., the $CO_2$ is fed from the gas container 20 to the beverage container 26 through the automatic expansion valve construction 22 which is capable of reducing the gas pressure to the desired low charging pressure, such as 13.5 p.s.i.g. within the beverage container.

The charging gas is fed from the high pressure gas bottle or container 20 into the beverage space of the liquid or beverage container 26 to maintain the desired gas pressure as the beverage is periodically withdrawn for drinking purposes or the like through the faucet 28.

It has been discovered, according to this invention, that this great reduction in gas pressure, such as when $CO_2$, for example, passes from the high pressure container 20 to the low pressure beverage space 24 is likely to damage the valve construction 22 because of the abrasive and erosive action of the high pressure liquid $CO_2$ on the valve parts. It is also likely to produce $CO_2$ frost or snow particularly if any liquid $CO_2$ from the high pressure gas container 20 reaches and passes through the expansion valve construction 22. This interferes with proper life and operation of the expansion valve construction.

According to this invention, means are provided to prevent an unrestricted large volume flow of high pressure gas from reaching and passing through the automatic expansion valve construction 22. For this purpose, a protecting tube 30 is placed with a protecting end 32 protecting and preventing the feeding of a large quantity of high pressure gas to the valve inlet 34 of the expansion valve construction 22. The other or intake end 36 of the tube 30 is placed within a central part of the high pressure gas container 20 in such a position that the liquified gas in the container cannot readily and continuously submerge this intake end of the tube. The maximum amount of liquified gas with which the high pressure container is loaded is chosen to have a normal level, such as illustrated at 37, which is below such intake end 36 of the protecting tube. This level line 37 is intended to indicate the maximum quiescent level which should be used when the container 26 is held in the normal horizontal dispensing position of FIGURE 1. The container ordinarily does not stand on its faucet end 40 or its bung end 42 when stored in the domestic refrigerator.

Additionally, a liquified gas arresting orifice or restrictor 44 is provided adjacent this intake end 36 of the tube 30 to prevent any substantial amount of liquified gas from being accidentally splashed into the tube 30. Such orifice also prevents any large volume of high pressure liquified and/or unliquified gas from abrasively and erosively rushing to and through the expansion valve construction 22 when the valve is automatically opened to supply gas at a reduced pressure to the beverage space.

While the restrictor or orifice 44 does not prevent a high static pressure gas from reaching the inlet of valve construction 22 when the valve construction 22 is not open, it is capable of reducing the gas pressure from between 500–600 ps.i.g. at the restrictor 44 to approximately 350–450 p.s.i.g. at the valve inlet 34 when the valve 125 is opened any substantial amount. This reduction in pressure of the gas passing through the restrictor is in the order of ¼ of the difference in pressure between the high pressure space (500–600 p.s.i.g.) and the low pressure space (13.5 p.s.i.g.)

This invention may be used in combination with an improved check valve construction 46, which is, per se, the subject of another patent application. This check valve construction may be made in the form of a flexible, rubber-like cylindrical tube 48 with a closed end 50 and an open end 52 and with longitudinal slit means which may include one or more substantially longitudinal slits 54 in the side wall of the tube. A relatively solid cylindrical member 56, of aluminum alloy 6061–T6, for example, or the like, is placed in this tube adjacent the closed end 50 to prevent inward collapse of the tube when the pressure outside the tube exceeds the pressure inside the tube. The open end 52 may be telescoped over a cylindrical extension 54' which has passageways 58 and 59 for the flow of expanded or reduced pressure charging gas from the valve construction 22 to the low pressure space 24, as elsewhere more fully described. This check valve prevents reverse flow of gas and/or liquid if the pressure in passageway 58 should become less than the pressure is space 24.

The tube 48 may be 1$\frac{3}{32}$ inches long, $\frac{5}{16}$ inch O.D., $\frac{1}{16}$ inch wall thickness with slits $\frac{5}{16}$ inch long. It may be made of rubber compound or the like. The cylindrical member 56 may be ⅜ inch long and $\frac{5}{32}$ inch in diameter.

The extension 54', FIGURE 7, may be provided with a cylindrical restricting passageway 57 at its end to aid in controlling the flow of $CO_2$ to the beverage compartment 24. This passageway 57 may be in the order of .024 inch in diameter and $\frac{1}{16}$ inch in length.

The restricting passageway 57 is placed on the down stream side of the expansion valve construction 22 and is made of a size that will supply $CO_2$ in gas phase from the approximately 13 p.s.i.g head from the valve construction into the gas space 24 of the keglike container 26 only in a flow supply sufficient to compensate for the $CO_2$ requirements due to the beverage servings which are withdrawn through the faucet 28.

The restriction 57 provides a restriction which will limit the initial rush of $CO_2$ when the containers 20 and 26 are serviced at the brewery so there can be no sustained harmful rush of $CO_2$ through the pneumatic tire inflation and deflation type of valve 125 at any time, either when the containers 20 and 26 are being filled and charged, or when the container 20 is being emptied of $CO_2$ after it has been removed from the container 26.

This invention may be used with an improved discharge pressure adjustment for the valve construction 22. This is accomplished by adjustment of the compression of spring 58', as shown in FIGURES 3, 4, 11 and 12, by the insertion and rotation of a rod, not shown, with a knurled end within the cavity 60 of the rotatable screw 62, which causes longitudinal movement of the internally threaded nut 64. The nut 64 is longitudinally movable but rotationally fixed because of the telescoping hexagonal surfaces 66 and 68 respectively on the outside of nut 64 and on the inside of the cup-like member 70. The member 70 is stationarily held when the externally threaded nut construction 72 is longitudinally screwed against the shoulder 74, FIGURES 3 and 4, of the cup-like member 70. The nut construction 72 may be rotatably driven by a wrench, not shown, having octagonal surfaces to engage the internal octagonal surfaces 74' of nut construction 72.

The foregoing adjustment of the compression of spring 58' by axial movement of nut 64, and rotation of screw 62 provides an advantageous adjustment of the gas discharge pressure of the valve construction 22.

This invention may be used in combination with an improved safety blowoff construction to prevent excessive and dangerous pressures in the gas container 20. This may include a rupture disc 76, FIGURES 3, 5 and 6, which receives the full pressure of the gas in the interior of the container 20 by passageways 78 and 80. The rupture disc 76 rests on a resilient rubber-like O-ring 82 and is held by a hollow shear block 84, which in turn is pushed down by the externally threaded nut 86, which engages the internal threads 88 of the support construction 90. The nut construction 86 may be provided with an internal hexagonal surface 92 for turning the nut by a suitable wrench, not shown.

This invention may be used in combination with a gas charging construction for the container 20. This includes a disc 94, FIGURES 3 and 13, which rests on the shoulders 96 of passageway 100. The disc 94 is held in place by a resilient rubber-like plug 98 which is fitted into the passageway 100. The plug has a charging needle receiving recess 99 and resiliently closed opening 101, for charging the container 20. The disc 94 is provided with openings 102 which are located near the periphery of the disc 94. The disc 94 has a central solid portion 104 which prevents the charging needle and any unauthorized wire, nail or the like, from engaging the stem 106 of an "inflation" charging or inwardly opening valve which may be of the Schrader type of inflation valve 108. The valve 108 may threadedly engage the threads 110' and resiliently engage the conical portion 112 of the passageway which is connected to the passageways 114 and 116, which are connected to the interior of the container 20. By this construction, damage to the stem 106 of the valve by the charging needle is prevented. Also, dangerous discharge of liquid $CO_2$ by the wire, or nail is also prevented.

A feature of this invention relates to an improved restrictor 44 and method of making the same. The restrictor 44 may be made at the end 36 of the protective tube 30.

The original tube 30 may be cut from a long cylindrical tube to produce right angled cuts at the ends. The ends may then be beveled, as shown in FIGURE 15. One end may be counterbored at 118 to produce the end 32 which is press fitted into the cylindrical wall 120 which may be coaxial with the valve receiving passageway 122, FIGURES 3, 4 and 9, which may have a conical surface at 124 to receive the usual resilient cone 127 of the "inflation" type of valve 125 which may be of the Schrader type.

The tube 30 may be press fitted into the passageway 122 while the flat portion 124', FIGURE 4, of the container support 90 rests downwardly on a stationary plate die of a press, not shown. The tube end 32 may be placed at the entrance of passageway 122 and then the end 36 may be pushed down by the press to press fit the end 32 in passageway 122.

Thereafter, the tube end 36 may have a stainless steel spring wire, not shown, in the order of from .0045 to .006 inch in diameter, held coaxially with the unflattened end 36. The end 36 may then be flattened, as shown in FIGURES 16 and 17 between two flat press plates to form the flat surfaces 126 which are tightly formed against each other and which may measure ¼" along the longitudinal axis of tube 30. The wire, which is long enough to extend out beyond end 36, so that the wire may then be pulled out, leaving the longitudinal restrictor passageway 44 extending into the interior of the tube 30. The original tube 30 may be 3 inches long, with ¼ inch O.D., with an .035 wall to provide a .180 inch I.D., and bevels at the ends which may be 30° to the longitudinal axis of the tube. The tube may be made of aluminum alloy 6061–T6.

This restrictor construction 44 at tube end 36 is located so the maximum quiescent $CO_2$ liquid level, such as 37 in FIGURE 1, is below the orifice construction 44 at tube end 36, as indicated in FIGURE 1. This prevents feeding any harmful amount of liquid $CO_2$ to the valve inlet 34.

The restrictor 44 also reduces the gas pressure in tube 30 150 p.s.i.g. while passing through the orifice 44 when the valve construction 22 is opened to cause a flow of gas from the bottle 20 to the beverage space 24.

The restrictor 44 has a smaller cross sectional area than the inlet of the automatic valve 125.

This invention may be used in combination with an improved automatic pressure reducing valve construction 22, FIGURES 3, 4, 9 and 10. A Schrader or pneumatic tire inflating and deflating type valve 125 has a valve stem 128 which is engaged by a button 130, which is secured to a rubber-like diaphragm 132, which is held at its periphery 134 by the end 136 of cup-like member 70.

The button 130, FIGURES 9 and 10, has a circular flange 138 with openings 140. The diaphragm 132 is molded adjacent the flange 138 so circular extrusions 142 pass through the openings 140 and then are formed into a retaining rubber-like ring 144. This holds the button 130 securely on the diaphragm 132.

The diaphragm has a central extrusion 146 which receives a metal ring 148 with a thinner outside circular flange which receives the end of compression spring 58'.

The other end of spring 58' is received by adjustable nut 64, FIGURE 11, as previously described, so the exhaust pressure of the $CO_2$ in cavity 152 and beverage space 24 may be adjusted by turning screw 62 axially to move the nut 64 to vary the compression of spring 58', and its action on diaphragm 132.

The charging gas container or bottle 20 may have a reduced throat 152' which is externally threaded and engages the internal threads of a cylindrical extension 154 and seals the joint tightly by compressing the resilient O-ring 156 between the end 158 of the extension 154 and the shoulder 160 of the bottle or container 20. The extension 154 may be coaxial with the wall 120 and passageway 122.

A plastic cover 159 may have its outer flange 163 snapped over the flange 161 of the container support 90 after all of the parts have been assembled. The cover 159 has a cylindrical flange 162 to fit into the opening 88 and has a frusto-conical cup 164 with a charging needle opening 166.

If desired a second plastic cover 168, FIGURE 1, may be placed with its flange 169 over the flange 170 of the liquid container 26.

The support member 90 may have its flange 161 engage an O-ring 172 which engages a shoulder 174 of the container 26. A split inwardly biased ring 176 is placed in a groove 178 in the liquid container 26. The split ring 176 may be spread outwardly when it is desired to remove the support member 90 and $CO_2$ bottle 20.

A pop-off Schrader type of valve 180, FIGURE 4, is placed at the upper end 182 of passage 58 and threaded in passage 183 which valve relieves excessive pressure in the cavity 152. Another pop-off Schrader type of valve 184 relieves excessive pressure in the liquid space 24. Valve 184 is threaded in passage 185.

The support 90 can support the gas container 20, the expansion valve construction 22, the pop-off valves 180 and 184, the check valve 46, the rupture disc 76 construction and all of the other gas control parts of the dispensing apparatus. This support and all of the equipment carried by it can be removed from or inserted into the container 26 as a unit. This unit does not extend beyond the plane 186, FIGURE 1, of the edge 187 of the supporting flange 188. The surface 190 of the container 26 is concave so the interior of the container 26 can be washed by spray and drained when the container 26 stands on the flange edge 187 and while the support 90 and container 20, etc., are removed from the container 26.

The faucet 28 is completely located inward of the plane 192 which lies on the edge 194 of the faucet end of the cylindraceous keg-shaped container 26. The end wall 196 is concaved inward to acommodate the faucet entirely to the right of the plane 192, in FIGURE 1, so the keg 26 may be placed vertically with the edge 194 on a horizontal support while inserting or removing the container support 90 with container 20 attached thereto. Also the keg 26 may be filled with beverage and the like while the keg is so positioned with the support 90 and container 20 removed.

The faucet 28 may have a handle 198 which opens the faucet 28 when the handle 198 is pulled outwardly. A beverage conduit 200 may be a relatively rigid metal pipe and may extend downwardly at 202 near the normal lowest part of the keg 26 when it is positioned in its normal horizontal dispensing position. Proper foam preventing means, not shown, may be placed in the conduit 200, 202. The faucet 28 may threadedly engage the cylindrical wall 204 which is welded or otherwise secured to the end wall 196. If desired, the pop-off valve 184 may be placed on the faucet construction 28 instead of on the support 90.

When the keg or container 26 is returned to the brewery or beverage supplier, such supplier removes the support 90 with the attached gas container 20, etc., and empties any remaining beverage and thoroughly washes and sterilizes the container 26 and drains it with the bung end downward. The support 90 and container 20, etc., are also cleaned and sterilized. The container 26 is then placed with the edge 194 on a horizontally disposed support and is filled to the proper level with beverage so it will have a level such as 205 when the keg is horizontal. Then the support 90, container 20, etc., or a duplicate thereof, is inserted into the bung. It is then downwardly pressed with its flange 161 on the seal 172 which is carried by shoulder 174. The split ring 176 may then be placed in groove 178. The cover 159 may or may not have been removed. If removed it may be replaced (with a duplicate, if necessary) during the cleaning and other service operations. A second cover 168, or duplicate thereof, may be placed over the flange 170 of container 26, if desired.

The support 90, the gas container 20, etc., may be assembled as follows:

The tube 30, as shown in FIGURE 15, may be press fitted into the cylindrical wall 120, FIGURE 3. Valve 108, FIGURE 13, may then be inserted in opening 110 and properly tightened. O-ring 82 may be placed in opening 88, FIGURE 5, followed by rupture disc 76, which may be .325 to .330 inch in diameter, .0045 to .0050 inch thick and made of aluminum alloy 6061–0, for example, and of desired rupture characteristic. Then shear block 84 and retaining nut 86 may be added and nut 86 tightened sufficiently to prevent leakage past the disc 76, but not enough to damage the disc.

The assembly described in the preceding paragraph may then be placed in a press fixture to hold the .0045 to .006 inch diameter wire axially in the tube 30 and to press the end 36 of the tube 30 into the form of the restrictor passage 44 and flat sides 126 shown in FIGURES 16 and 17. The wire may then be withdrawn. The assembly so far made may be removed from the above fixture and may be tested for correct size of orifice by causing $CO_2$ gas at 520 p.s.i.g. to pass into the restrictor construction 44, 126 and through the tube 30. For example, the gas flow should be between 12 c.f.h. and 18 c.f.h. (cubic feet per hour) at 520 p.s.i.g. supply pressure and 0 p.s.i.g. discharge pressure, for a typical construction as heretofore described.

If the orifice 44 is satisfactory, the valve 125 may then be inserted and properly tightened in passage 122. The pressure relief valve 180, FIGURE 7, may be inserted at the end 182 of passage 58 and turned sufficiently to provide substantially the desired pressure relief. Likewise, pressure relief valve 184 is inserted in passageway 185, FIGURE 4, and likewise turned to provide substantially the desired pressure relief. The O-ring 156 is assembled on gas container or bottle 20 and the container 20 is then threaded and tightened into extension 154 of support 90.

Nut 64 is assembled on the screw 62, FIGURES 3, 4, 11 and 12, so the nut 64 is against the head 63 of the screw 62. The nut 64 is then loosened from the head 63 about a quarter of a turn.

The body 90 and bottle 20 are then placed on another assembly fixture to hold them in vertical position with cavity 152 upward. The diaphragm assembly which includes diaphragm 132 and member 130, FIGURES 9 and 10, is placed in the body 90 with the member 130 toward the valve 125. The spring seat 148 is then placed on the diaphragm with the small central part upward, FIGURE 9. The spring 58' is placed on the spring seat 148 of the diaphragm assembly. The screw 62 and nut 64 are placed on the spring 58'. The ring 72 is placed over the cup 70 with the octagon 74' in the direction shown in FIGURE 18 and this combined unit 70 and 72 is placed over the spring 58'. The spring cup 70 is depressed until diaphragm 132 is firmly seated against the diaphragm seat at the upper edge of cavity 152, and then the retaining ring 72 is screwed tightly against the cup flange 74, FIGURE 4. The cup 70 should not turn during this operation.

The disc 94 is inserted into the opening 100, FIGURE 13, followed by plug 98.

The aluminum plug 56 is placed in the check valve 48, FIGURE 7, and the check valve 48 is placed on the extension 54'. The protective cover 159 is then snapped over flange 167. This completes the assembly of the support 90, bottle 20 and associated parts for insertion into a liquid container 26.

The cover 159 should be capable of rupturing if any excessive pressures are relieved by any of the relief valves or the rupture disc. If desired, some part of the cover 159 may be made thinner than the main body and this thinner part may then be the rupture part of the cover.

If desired, the end 36 of the tube 30 and/or the restrictor 44 may be substantially at the volumetric center of the bottle 20, and the maximum amount of liquid $CO_2$ which is introduced into the bottle 20 may be restricted so the quiescent level of the liquid will always be below the end 36 of tube 30 and/or the restrictor 44 regardless of the positions in which the bottle 20 and container 26 are held. This will prevent any substantial amount of liquid from being introduced into the tube 30. The total capacity of bottle 20 may be 4 fluid ounces, and the amount of liquid of $CO_2$ which is introduced is elsewhere described.

If desired, the main part of the interior of tube 200, 202, FIGURE 1, may be a passageway approximately .09 inch in internal diameter extending from the inlet to a point near the faucet 28 where it may then taper outwardly to fit with the valve structure. This passageway may be so shaped that it drains completely when the container 26 is placed in vertical position to stand on edge 187.

The body 90 which supports the bottle 20 may be a massive body of the character illustrated in the drawings. It may be made of aluminum alloy S–12–A, if desired. The body 90 is supported in the container 26 by the end wall which includes the flange 167. The body 90 carries all of the gas flow controls and the propellant gas container or bottle 20. This produces a propellant gas unit which is readily insertable in or removable from the liquid container or keg 26.

The propellant needle receiving plug 98 which is in the propellant valve passageway 110 and disc 96 protects the valve 108, FIGURE 13, from being accidentally discharged if it is tampered with, with a wire, nail or the like. The plug 98 may be a cup-shaped rubber-like plug with an inwardly directed rim and with the needle receiving self-sealing opening 101 in the bottom of the cup-shaped plug. This shape aids in maintaining the plug 98 in the passageway and permits it to cooperate with the apertured disc 94 in an effective manner, to prevent accidental and dangerous discharge of liquid $CO_2$, if a pin, nail or wire is inserted in an unauthorized manner.

The liquid $CO_2$ is generally inserted in the container 20 after the beer has been placed in the container 26 and after the support 90 and container 20 have been placed and sealed in the container 26. Between one and one-half to two and one quarter fluid ounces of liquid $CO_2$ may be injected into the receptacle 20 through the valve 108.

It is thus to be seen that new and useful improvements have been provided in connection with gas charging and liquid dispensing apparatus and method.

While the form of the invention now preferred has been disclosed as required by the statutes, other forms may be used, all coming within the scope of the claims which follow.

What is claimed is:

1. A combination comprising: a charged liquid container having a liquid dispensing faucet and a charging gas container receiving opening; a charging gas container inserted in said liquid container through said opening; an automatic pressure reducing valve in said liquid container having a valve inlet receiving relatively high pressure charging gas from said gas container and having a valve outlet discharging relatively reduced pressure gas into the surrounding space within said liquid container which is outside said gas container; a protecting tube within said gas container feeding charging gas to said valve inlet and having an intake tube end placed within a part of the said gas container above the normal level of liquified gas in said container; and restrictor means extending into said container and forming a charging gas arresting restriction adjacent said intake tube end, said protecting tube having a passageway sized to provide a sufficiently large expansion chamber between said restrictor means and said automatic pressure reducing valve to insure gasification of substantially all of the liquified gas.

2. A combination according to claim 1 in which said restrictor means is in the form of a fixed restriction having a smaller fluid flow cross-sectional area than that of said valve inlet and of said tube.

3. A combination comprising: a charged liquid container having a liquid dispensing outlet and a charging liquified gas container within said liquid container; an automatic pressure reducing valve in said liquid container having a valve inlet receiving charging gas from said gas container and having a valve outlet discharging reduced pressure gas into the surrounding space within said liquid container which is outside said gas container; a protective passageway means having a protecting end protecting and feeding charging gas to said valve inlet and having a passageway means intake end extending into said gas container; and charging gas restrictor means in said passageway means of less flow area than the flow area of said passageway means with said passageway means having a flow area to provide a sufficiently large expansion chamber between said charging gas restrictor means and said automatic pressure reducing valve to insure gasification of substantially of the liquified gas.

4. A combination according to claim 3 in which said charging gas container contains liquid and gaseous $CO_2$ and said restrictor means prevent the feeding of any harmful amount of liquid $CO_2$ to said valve means inlet and reduces the $CO_2$ pressure in the order of 150 p.s.i.g. while passing said restrictor means.

5. A combination according to claim 3 in which said restrictor means has a diameter in the order of .0045 to .006 inch.

6. A combination comprising: a charging liquified gas container to be placed in a charged liquid container; support means for said gas container attachable to said liquid container to support said gas container in said liquid container; an automatic pressure reducing valve in said support means with a valve inlet receiving charging gas from said gas container and having a valve outlet to discharge reduced pressure gas into the surrounding space within said liquid container which is outside said gas container; and a charging gas restrictor means restricting the flow of charging gas to said valve inlet, said restrictor means having a flow cross-sectional area equal to a diameter in the order of from .0045 to .006 inch and a length in the order of ¼ inch and being connected to said valve inlet by passageway means in the order of three inches long and having a flow cross-section area equal to an internal diameter in the order of .180 in.

7. A combination comprising: a charging liquified gas container to be placed in a charged liquid container; support means for said gas container attachable to said liquid container to support said gas container in said liquid container; an automatic pressure reducing valve in said support means with a valve inlet receiving charging gas from said gas container and having a valve outlet to discharge reduced pressure gas into the surrounding space within said liquid container which is outside said gas container; and a charging gas restrictor means restricting the flow of charging gas to said valve inlet, and a tube with a first end protecting said valve inlet and with a second end extending substantially into the central part of said gas container, said tube having a passageway sized to provide a sufficiently large expansion chamber between said charging gas restrictor means and said automatic pressure reducing valve to insure gasification of substantially all of the liquified gas.

8. A combination according to claim 7 in which said second end is provided with said restrictor means.

9. A combination comprising: a support means to support a higher pressure gas inner container in an outer substantially surrounding lower pressure gas container, said inner container containing higher pressure gas in both liquid and gaseous phase, said support having a valve inlet receiving gas from said inner container and a reduced pressure outlet into said outer container; and a tube having a first end secured around said valve inlet and extending in said gas inner container toward the central part of said container, said tube having a restrictor construction adjacent the second end of less flow area than said tube, said last named flow area being sufficiently small to prevent the flow of any harmful amount of higher pressure gas in liquid phase from reaching said valve inlet and said tube having a passageway sized to provide a sufficiently large expansion chamber between said restrictor construction and said valve inlet to insure gasification of substantially all of said higher pressure gas.

10. A combination according to claim 9 with said support having a surrounding wall of greater diameter than said tube extending from said support; said higher pressure gas inner container being secured in said surrounding wall, said second end of said tube extending into said inner container substantially toward the central part of said inner container and above said higher pressure gas in liquid phase.

11. A combination according to claim 9 with said second end of said tube flattened with a restricting passageway in said second end.

12. A method of charging a relatively low pressure gas container with reduced pressure $CO_2$ gas from a relatively high pressure gas container which contains liquid and gaseous $CO_2$ which comprises passing relatively high pressure gaseous $CO_2$ from said relatively high pressure gas container through a restricting means capable of reducing the pressure of said gaseous $CO_2$ from between 500–600 p.s.i.g. to approximately 350–450 p.s.i.g., then through an automatic pressure reducing valve means to reduce the pressure of said gaseous $CO_2$ approximately to 13.5 p.s.i.g., and then into said low pressure gas container and providing an expansion chamber between said restricting means and said pressure reducing valve means of a sufficient size to insure gasification of substantially all of the $CO_2$.

13. A method according to claim 12 in which said restricting means is a fixed restricting means having a flow cross-sectional area equal to a diameter in the order of from .0045–.006 inch and said expansion chamber having a volume equal to a passageway means in the order of three inches long and having a flow cross-section area equal to an internal diameter in the order of .180 inch.

14. A method of feeding high pressure gas from a high pressure space containing said gas in both liquid and gaseous phase into a controlled low pressure space which comprises passing said high pressure gas in gaseous phase through a fixed restrictor which materially reduces the pressure of said high pressure gas in the order of ¼ of the difference in pressure between said high pressure space and said low pressure space and then through an automatic pressure reducing valve into said low pressure space, said valve having pressure responsive means to maintain the gas in said low pressure space at a controlled low pressure and providing an expansion chamber between said fixed restrictor and said pressure reducing valve of sufficient size to insure gasification of substantially all of said high pressure gas.

15. A combination comprising: an outside wall structure forming the enclosing space of a dispensing container; a liquid dispensing valve for said container having an inlet flow connection extending near a low position within said enclosing space; a propellant gas container within said enclosing space and having an end wall; valve means carried by said end wall for automatically introducing propellant gas from said gas container into contact with said liquid in response to pressure conditions within said space; and a tube with a restrictor extending from said valve means substantially toward a central portion of said gas container, said tube having a passageway sized to provide a sufficiently large expansion chamber between said restrictor and said valve means to insure gasification of substantially all of the propellant gas.

16. A combination comprising: a propelled liquid and propellant gas low pressure container; a liquid and gaseous propellant gas high pressure container; a tube extending into a central part of said high pressure container and having a restricting passageway propellant gas intake in said central part and having a propellant gas outlet; an automatic expansion valve having an inlet connected to said propellant gas outlet, said valve having an outlet connected to said low pressure container and said tube having a passageway sized to provide a sufficiently large expansion chamber between said restricting passageway propellant gas intake and said automatic expansion valve to insure gasification of substantially all of the propellant gas.

17. A combination according to claim 16 with said restricting passageway being formed by flattening an end of said tube around a wire having a diameter in the order of from .0045 to .006 inch, and by thereafter pulling said wire from said flattened tube end.

18. A combination according to claim 17, in which said restricting passageway is in the order of ¼ inch in length.

References Cited by the Examiner
UNITED STATES PATENTS 1,959,815  5/1934  Corcoran _____ 222—52
2,909,196  10/1959  Jeffreys _____ 138—44

LOUIS J. DEMBO, *Primary Examiner.*

HADD S. LANE, *Examiner.*